June 28, 1960     B. J. BUCHANAN     2,942,772
AQUARIUM AERATOR PUMP
Filed March 23, 1959
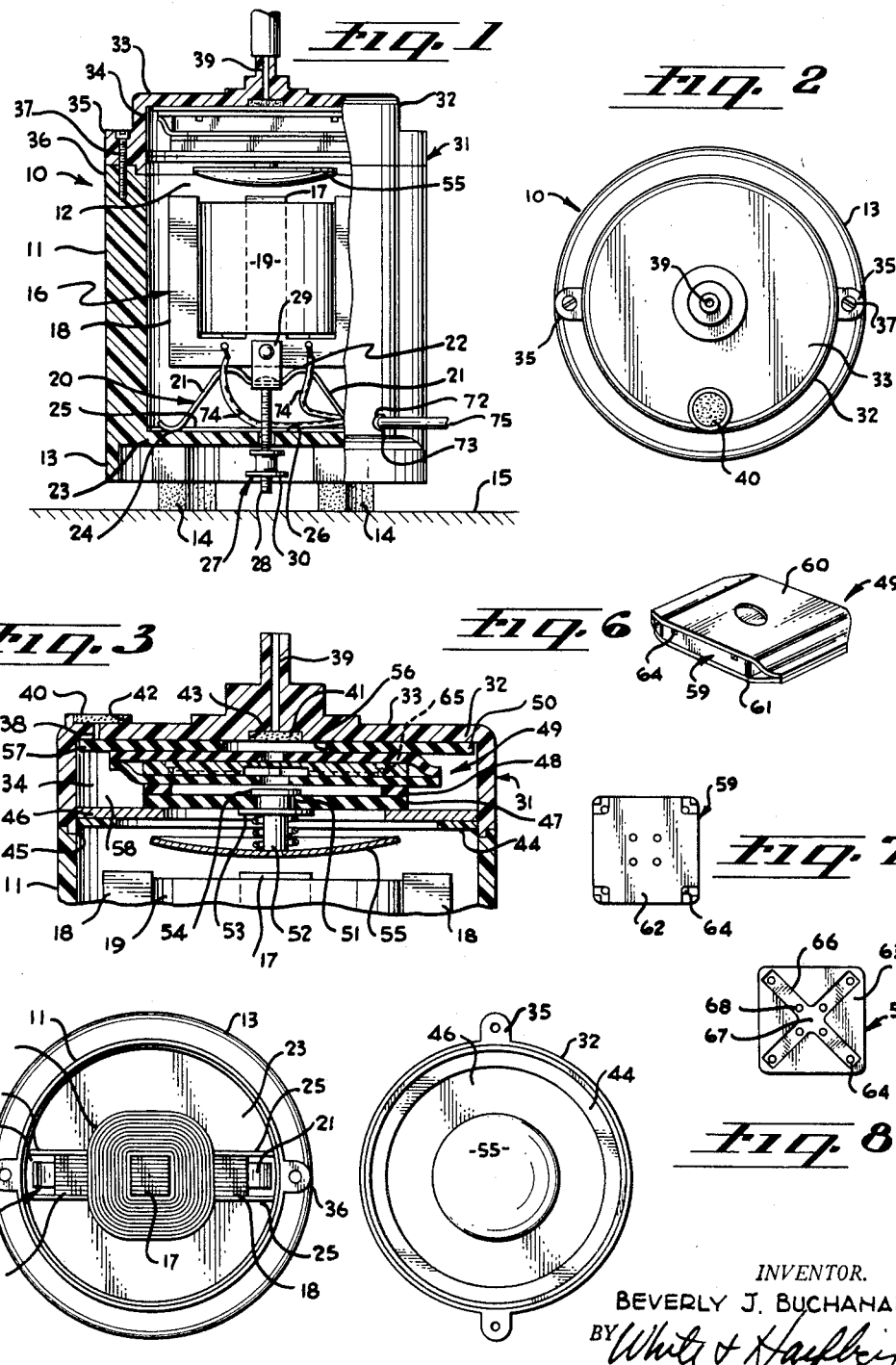
INVENTOR.
BEVERLY J. BUCHANAN
BY
ATTORNEYS United States Patent Office 2,942,772
Patented June 28, 1960

2,942,772

AQUARIUM AERATOR PUMP

Beverly James Buchanan, 5765 Los Angeles Way, Buena Park, Calif.

Filed Mar. 23, 1959, Ser. No. 801,328

10 Claims. (Cl. 230—55)

This invention relates generally to improvements in the construction of aquarium aerators and more particularly has to do with improvements in mounting and enclosing components of aquarium aerator pumps, particularly as respects the electromagnet and the pumping apparatus actuated by the electromagnet.

In devices of the sort referred to, it is observed that the useful life of the electromagnet is generally longer than the serviceable life of the pumping apparatus, and in particular the diaphragm type pump actuated by the electromagnet. However, in the past when the pumping apparatus failed in service, it was necessary for the user to purchase a complete new unit including the electromagnet and the diaphragm type pump all enclosed within a single shell. Since the cost of the electromagnet represents a considerable portion of the total expense of the complete unit, it is apparent that the user is put to considerable unnecessary expense in replacing an aquarium aerator, the pumping component of which has failed.

Another disadvantage common to known aquarium aerators is the observed tendency of such aerators to be damaged by water siphoned back from a fish tank through the air delivery line extending from the aerator to the tank. Until now, no means has been available to prevent such siphoning when the aerator is not in use, other than disconnecting the air delivery line to the tank and the provision of a check valve in the line. If however, the user forgets to so disconnect his air line, he is apt to find his aerator and particularly the components thereof damaged after an undesirably short period of use of the apparatus. Also, the check valve is subject to malfunctioning.

The above disadvantages of known aquarium aerators are overcome in the present apparatus which comprises a receptacle having an end opening, an electromagnet positioned within the receptacle, the electromagnet having a pole facing the receptacle end opening, and a pumping assembly in the form of a head removably attached to the receptacle and covering the end opening thereof, the assembly including a casing having air inlet and outlet openings remote from the electromagnet. All of the pumping assembly components are typically carried by the casing as a part of the head, and thus are removable from the remainder of the aerator, namely, the receptacle and the electromagnet therein so as to be replaceable in the event of damage to one or more of the pumping components.

Thus for example, the pumping assembly includes a metallic armature facing the electromagnet pole, a flexible pumping diaphragm carried in the casing and supporting the armature for oscillation toward and away from the pole, and a diaphragm type valve operable to respond to armature induced reciprocation of the pumping diaphragm to pump air through the inlet and outlet openings in the casing. Since the latter are remote from the electromagnet, and are typically formed in the top of the casing, the pumped air is not heated by the electromagnet. Because the air is not heated, there is no reduction in pressure within the air delivery line extending to the fish tank after the aerator is shut down, with the result that the fish tank water is not siphoned back into the line and into the aerator itself which, as explained, is a serious disadvantage with the previously known devices of this sort.

Other features and advantages of the invention include the provision of retainer means holding the components in stacked relation within the casing, the self centering of such components therein and the mounting of the electromagnet in the receptacle, all of which are accomplished in a unique and different manner, providing for completely reliable operation of the aerator, and at the same time minimizing the cost of fabrication thereof.

Other features and objects of the invention, as well as the details of an illustrative embodiment, will be more fully understood from the following detailed description of the drawings, in which:

Fig. 1 is a vertical elevation of the aerator partly broken away to show its interior construction;

Fig. 2 is a plan view looking down on top of the head of the aerator;

Fig. 3 is an enlarged vertical section through the upper portion of the aerator;

Fig. 4 is a plan view looking downward within the interior of the aerator and upon the electromagnet therein;

Fig. 5 is a view looking upward toward the underside of the pumping assembly or head;

Fig. 6 is a perspective view of the diaphragm and valve type pump;

Fig. 7 is a view of one side of the pump body; and

Fig. 8 is a view of the opposite side of the pump body.

In the drawings, the aquarium aerator pump is generally shown at 10 and includes receptacle 11 having an upper end opening 12 and a re-entrant base 13 within which shock absorbers 14 are received, the latter mounts projecting downwardly to support the receptacle on a table or other surface 15. Downwardly received within the cylindrical receptacle is a motor in the form of an E-shaped laminated core 16, including a center pole 17 and opposite side poles 18, the center pole having a winding 19 extending therearound and connected with electrical alternating current leads 74.

The motor is mounted in position within the receptacle 11 by a vibration isolating leaf spring 20 having legs 21 which are curved to abut and support the core at locations 22, and to seat against the bottom partition of the receptacle at locations 24. Horizontally extending and spaced apart parallel ridges 25 on partition 23 form depressions 26 therebetween receiving the downwardly curved portions of the leaf spring legs 21 so as to resist rotation thereof around the vertical central axis of the unit. The legs 21 urge the electromagnet upwardly, and at the same time are held in flexed condition by the screw adjustment means generally shown at 27. The latter includes a screw 28 extending vertically through the partition 23 and pulling downwardly on a clip 29 which is riveted to the electromagnet core, the clip also retaining the leaf spring 20 at the center thereof. A adjustable nut 30 is threaded on the downwardly projecting screw 28 within the re-entrant base 13 of the receptacle for adjusting the vertical location of the electromagnet with respect to the receptacle, all for the purpose of controlling the speed and air delivery output of the pumping device, which will now be described.

The pumping assembly is generally indicated at 31 in the form of a head covering the upper open end 12 of the receptacle. The assembly includes a plastic casing 32 having a top wall 33 and a skirt 34 provided with flanges 35 extending directly above flanges 36 of the plastic receptacle. Screws 37 are threaded downwardly through the flanges 35 and 36 for holding the casing tightly against the upper rim of the receptacle as shown.

As best shown in Fig. 3, the casing has an air inlet opening 38 in the top portion or wall 33 near the skirt 34, and an air discharge opening or outlet 39 which extends vertically and axially with respect to the axis of the casing and receptacle. Air filters, typically in the form of felts 40 and 41 are received in enlarged counterbores 42 and 43 adjacent and overlying the inlet and outlet openings 38 and 39.

A series of pump components are held in vertically stacked relation within the casing 31 by an annular plastic retainer 44 which is received upwardly into the lower open end of the casing and is held in place by an adhesive such as shown at 45. These components include in vertical sequence metallic annular support 46, a thick rubber pumping diaphragm 47, reduced thickness rubber spacer 48, a diaphragm type valve assembly 49, and finally another rubber spacer 50 bearing against the underside of the casing partition 33. Components 47, 48, 49 and 50 are square in outline and have diagonal corner-to-corner dimensions substantially equal to the inner diameter of the casing skirt 34 so as to be centered by the skirt.

The pumping diaphragm 47 contains a central opening 51 through which a stem 52 extends, the latter being flanged at 53 and 54 at opposite sides of the pumping diaphragm 47 for connecting the stem thereto. Carried at the lower end of the stem is a dished metallic armature 55 which extends generally horizontally in spaced relation to the central and side poles 17 and 18 of the electromagnet. Likewise, the rubber diaphragm 50 contains a central opening 56 through which air is adapted to discharge outwardly through the outlet opening 39 in the casing. Diaphragm 50 also has a corner portion 57 which overlaps the inlet opening 38 and is adapted to flap back away from the inlet 38 to allow air to enter the inlet into the space 58 formed between the skirt 34 of the casing and the square components 47, 48, 49 and 50.

The valve 49 includes a square valve body 59, shown in Figs. 6 through 8, and valving disphragms 60 and 61 overlying the upper and lower sides 62 and 63 of the body 59. The latter contains corner air inlets 64, passages 65 extending through the body between its opposite sides 62 and 63, and diagonally extending passages 66 at the bottom side of the body. Further, the body contains a well 67 centered in the underside of the bottom 63 and discharge passages 68 extending through the body from the well 67 to the upper side 62, in such relation that the upper diaphragm 60 overlaps the passages 68.

In operation, upon downward movement of the armature 55 the pumping diaphragm 47 is drawn downwardly by the electromagnet, causing the diaphragm 61 facing the underside 63 of the body 59 to be drawn downwardly to place passages 66 and the well 67 in intercommunication. This allows air to be drawn through the inlet 38 into the space 58 within the casing and through the inlet passages 64 into the well 67. At the same time, the upper diaphragm 60 is drawn downwardly against the discharge passage 68 to prevent air from being drawn from the outlet 39 into the valve. Upon upward reciprocation of the armature, the lower diaphragm 61 seals against the underside 63 of the valve body 59, and closes off communication with the diagonal passages 66 and the well 67, preventing discharge of air through the inlet passages. At the same time upward movement of the diaphragm 61 discharges air through the outlet passages 68 and past the now upwardly displaced diaphragm 60 and through the discharge outlet 39 to the fish tank.

It will be observed that all air flow is entirely confined to the space above retainer 44 and the annular body 46 against which the flexible diaphragm 47 seals. Therefore, the air is not in communication with the interior of the receptacle 11 within which the electromagnet is received, and which interior is heated by the electromagnet. As a result the air is not heated in passing through the pump but remains cool, so that after pump operation no water will be siphoned back into the pump through the discharge outlet 39.

Should the pump assembly become inoperative for any reason it may be quickly removed from the receptacle 11 by first unscrewing the fasteners 37 and then lifting the casing off the receptacle. Thereafter a new pump assembly may be attached to the receptacle and operation of the aerator continued, all without having to replace the relatively costly electromagnet.

In Fig. 1 there is shown a felt washer 72 in the receptacle opening 73 through which the leads of cord 75 extend. Washer 72 muffles the hum of the electromagnet and also prevents entrance of small air borne particles into the receptacle during "breathing" of air through opening 73 caused by reciprocation of diaphragm 47.

I claim:

1. An improved aquarium aerator construction, comprising a receptacle having an end opening, an electromagnet within the receptacle interior and adapted to be connected to a source of electromagnetic current, said electromagnet being adapted in operation to heat the air about the electromagnet in the receptacle interior, said electromagnet having a pole facing the receptacle end opening, and an air pumping assembly in the form of a head removably attached to the receptacle and covering said end opening thereof, said assembly including a casing having air inlet and outlet openings remote from said electromagnet, a metallic armature facing said pole in spaced relation thereto, a flexible pumping diaphragm carried in the casing and supporting said armature for oscillation toward and away from said pole, only said pumping diaphragm supporting said armature, and a diaphragm valve operable in response to armature induced reciprocation of said flexible pumping diaphragm to control air flow through said inlet and outlet openings, said assembly forming an imperforate barrier extending across the receptacle end opening to prevent mixing of pumped air flowing through said head assembly with warm air heated by the electromagnet within the receptacle interior whereby said pumped air is not heated by said electromagnet.

2. An improved aquarium aerator construction, comprising an upright receptacle having an upper end opening, an electromagnet within the receptacle interior and adapted to be connected to a source of electromagnetic current, said electromagnet being adapted in operation to heat the air about the electromagnet in the receptacle interior, said electromagnet having a pole facing upwardly, an air pumping assembly in the form of a head and means removably attaching said head to the receptacle with said head covering the upper open end thereof, said assembly including a casing having air inlet and outlet openings remote from said electromagnet, a metallic armature projecting downwardly into said receptacle and facing said pole in spaced relation thereto, a flexible pumping diaphragm carried in the casing and supporting said armature for vertical oscillation toward and away from said pole, only said pumping diaphragm supporting said armature, and a diaphragm valve operable in response to armature induced reciprocation of the flexible pumping diaphragm to control air flow through said inlet and outlet openings, said assembly forming an imperforate barrier extending across the receptacle end opening to prevent mixing of pumped air flowing through said head assembly with warm air heated by the electromagnet within the receptacle interior whereby said pumped air is not heated by said electromagnet.

3. An improved aquarium aerator construction, comprising an upright receptacle having an upper end opening, an electromagnet within the receptacle interior and adapted to be connected to a source of electromagnetic current, said electromagnet being adapted in operation to heat the air about the electromagnet in the receptacle interior, said electromagnet having a pole facing upwardly, an air pumping assembly in the form of a head and means removably attaching said head to the receptacle with said head covering the upper open end thereof, said assembly including a casing having air inlet and outlet openings remote from said electromagnet, a metallic armature projecting downwardly into said receptacle and facing said pole in spaced relation thereto, a flexible pumping diaphragm carried in the casing and supporting said armature for vertical oscillation toward and away from said pole, only said pumping diaphragm supporting said armature, and a diaphragm valve operable in response to armature induced reciprocation of the flexible pumping diaphragm to control air flow through said inlet and outlet openings, said assembly forming an imperforate barrier extending across the receptacle end opening to prevent mixing of pumped air flowing through said head assembly with warm air heated by the electromagnet within the receptacle interior whereby said pumped air is not heated by said electromagnet, said valve and flexible pumping diaphragm being loosely received upwardly in the casing, and removable retainer means holding said valve and pumping diaphragm in stacked relation within the casing.

4. The invention as defined in claim 3 in which said air inlet and outlet openings are at the top of the casing.

5. The invention as defined in claim 3 in which said casing holds said valve and pumping diaphragm in vertical alignment.

6. The invention as defined in claim 4 in which said casing and receptacle are cylindrical and said retainer is annular.

7. The invention as defined in claim 6 including an elastomer diaphragm stacked between said valve and the upper end wall of the casing, said elastomer diaphragm having a corner flap underlying said inlet opening in the upper end wall of the casing.

8. The invention as defined in claim 7 in which said valve and pumping diaphragm have generally rectangular peripheries and have diagonal dimensions between opposite corners substantially equal to the bore diameter of said cylindrical casing.

9. The invention as defined in claim 2 including a leaf spring connected to said electromagnet and urging the electromagnet toward said armature, screw adjustment means acting against said leaf spring to control the spacing between the electromagnet pole and said armature, and ridge means at the inside of said receptacle resisting rotation of said leaf spring about a vertical axis therein.

10. The invention as defined in claim 4 including air filters extending across said inlet and outlet openings.

References Cited in the file of this patent
UNITED STATES PATENTS

| | | |
|---|---|---|
| 1,713,073 | Carter | May 14, 1929 |
| 2,707,074 | Tussey | Apr. 26, 1955 |
| 2,747,789 | Szekely | May 29, 1956 |
| 2,809,589 | Randolph | Oct. 15, 1957 |
| 2,814,429 | Buchanan | Nov. 26, 1957 |